Aug. 31, 1937.  J. W. HALE  2,091,391
CHANGE SPEED SYSTEM
Filed April 15, 1935
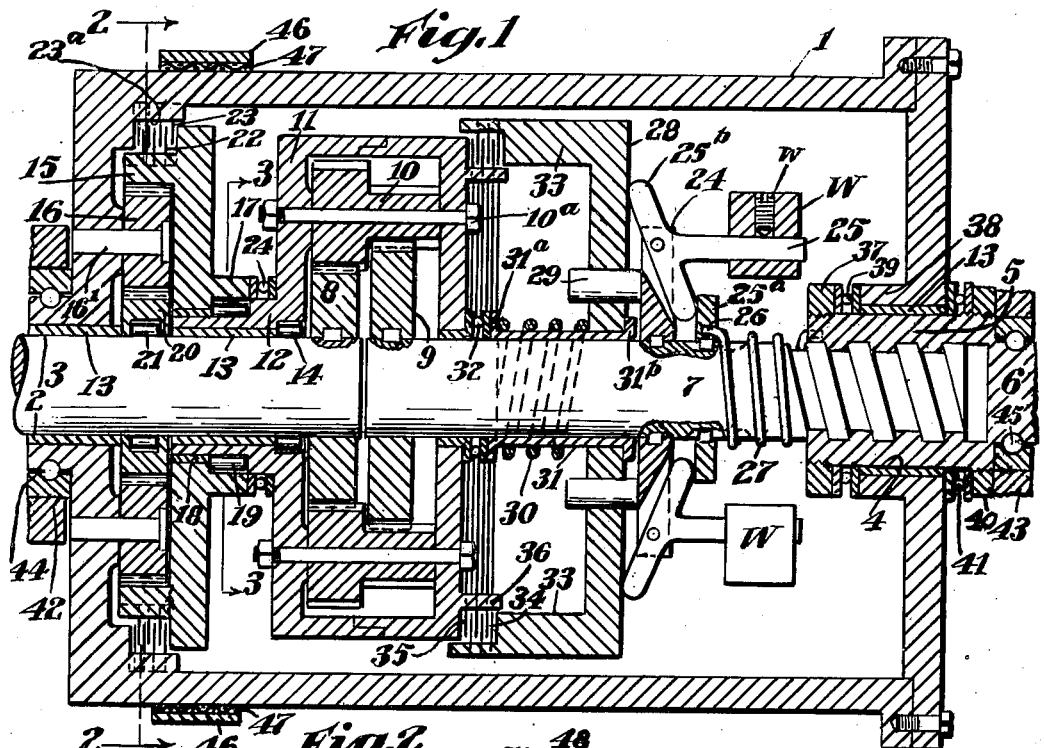
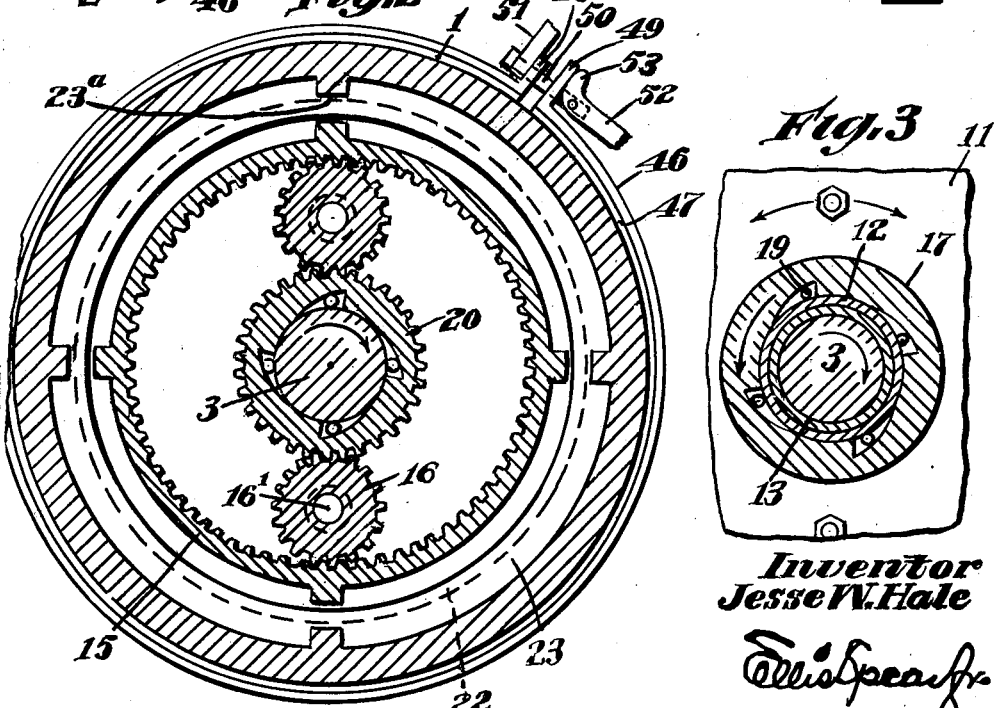
Inventor
Jesse W. Hale
By Attorney Patented Aug. 31, 1937

2,091,391

UNITED STATES PATENT OFFICE 2,091,391

CHANGE SPEED SYSTEM

Jesse W. Hale, Newton Center, Mass.

Application April 15, 1935, Serial No. 16,317

16 Claims. (Cl. 74—260)

My present invention relates to improvements in automatic change speed devices and particularly to the type of change speed device shown in my co-pending application, Serial No. 731,089, filed June 18, 1934.

One of the requirements of a change speed device is that it must permit the operator to vary the rate of acceleration as desired.

In my co-pending application, Serial No. 731,089, I have shown a change speed device in which a governor responsive to the speed of the driven shaft controls gear ratio changes. In that application, I have shown means controlled by the operator for dominating the governor so that the rate of acceleration or deceleration may be varied as the driver desires.

My present invention relates to a torque controlled element to cooperate with the governor in determining the driven shaft speed at which gear ratio changes are effected. This permits a more compact and simplified unit which effectively provides the essential "flexibility" of such a unit by opposing the action of the governor to an extent dependent upon the torque on the driven member.

Another object of my invention is to provide a clutch particularly consistent with the torque controlled aspect of my invention.

In the drawing I have shown an illustrative embodiment of my invention. Throughout the drawing and specification, like reference numerals indicate corresponding parts, and in the drawing;

Fig. 1 is a longitudinal view of a change speed device and control therefor.

Fig. 2 is a view along the lines 2—2 of Fig. 1, and

Fig. 3 is a section along the lines 3—3 of Fig. 1.

A gear transmission system such as is indicated in the accompanying drawing may be provided with a housing 1 having an axial port 2 at one end for the drive shaft 3, and a second axial port 4 at the other end for the hollow head 5 of the driven shaft 6. The head 5 is interiorly threaded to receive the threaded portion of the connecting shaft 7.

Fixed on the drive shaft 3 is a gear 8 and similarly fixed to the connecting shaft 7 is a gear 9, both in mesh with a differential step gear 10 shown as slidably and rotatably mounted on the shaft 10ᵃ in the gear casing 11, which shaft may be considered as an assembly bolt for the casing parts. The gear casing 11 is provided with an annular hub 12. Bushings are indicated at 13 for the hub 12, the shaft 3, and the shaft head 5.

Within the hub 12 is a clutch member 14 shown as of conventional roller type R, as suggested in Figs. 2 and 3. As long as the casing 11 is rotated oppositely to the drive shaft 3 or at the same or lesser speed, the rollers R will travel with the casing hub 12 freely over the shaft 3, but if the casing 11 tends to reverse its direction of travel, or its speed of rotation tends to become faster than that of the shaft 3, the clutch 14 acts to prevent such motion or reduces the speed of the casing to the speed of the shaft. The part played by this clutch 14, as well as the one-way clutches 19 and 21, later to be described, will be more fully set forth in connection with the description of phases of the operation of my change speed transmission system.

An internal rim gear member 15 meshes with idler pinion gears 16 mounted on studs 16¹ on the casing 1, and includes an annular hub 17 rotating on an indicated bushing 18 on the hub 12 of the casing 11. The hub 17 encloses a second one-way clutch 19 (see Fig. 3) of the same general construction as the first clutch 14, which is provided to lock the casing 11 through the hub 12 to the annular hub 17 of the gear 15 as long as the casing 11 is rotated in a direction opposite to that of the shaft 3.

The idler pinion gears 16 which are rotated by the rim gear 15 mesh with a gear 20 which is free on the shaft 3, and serve to rotate the gear 20, when in operation, in the same direction as the drive shaft 3. The gear 20 is provided with an indicated one-way clutch 21 which locks the gear 20 on the shaft 3 when its speed of rotation tends to be greater than that of the shaft 3.

The locking of the gear 20 by the clutch 21 limits the reverse direction trend of the idler assembly, gear case 11, and step gear 10 depending upon relative speeds. The ratio of gears 15 and 20 may be assumed to be, for example, on a one to four ratio. Assuming that the ratio between the gears 8, 9, and 10 be, for example, two to one, and the connected parts be stationary, the speed of the connecting shaft 7 and driven shaft 6 would be one-half the speed of the drive shaft 3. But with the assembly, the gear casing 11 and the step gear 10 are now rotating reversely and the ultimate speed of the driven shaft 5 will be controlled by the gear 20 which cannot rotate faster than the drive shaft 3. In other words, the ratio between the casing 11 and the gear 20 is one to four when the casing 11 is rotating reversely to the drive shaft 3, but as, however, the gear 20 cannot rotate faster than the drive shaft 3, the reverse rotation of the casing 11 is limited and the driven shaft is rotated at a four to one ratio providing a slow forward drive suitable for first speed.

The rim gear member 15 carries on its outer surface annular clutch discs 22 adapted to engage with similar discs 23 mounted in shoulder blocks 23ª on the casing 1. The annular hub 17 on the gear 15 and the casing 11 are spaced by thrust bearings indicated at 24.

The gear member 15 may be moved longitudinally of the shaft 3 with the gear casing 11 and thereby effect an interlock of the discs 22 and 23, whereupon the casing 11 will be held stationary to establish a two to one ratio, potentially in the gear system providing a suitable second speed. With this connection, the indicated one-way clutch 21 which held the gear 20 to the shaft 3 is released, permitting free rotation of the drive shaft 3 within the gear 20.

Carried by the connecting shaft 7 is a governor frame 24 which pivotally supports the weight arms 25. These are shown as of an inclined T-type of bell crank. They include an arm 25ª contacted by a ring 26 slidably splined on the shaft 7 under the influence of the spring 27 and an arm 25ᵇ bearing against the face plate 28 which is slidably carried by the studs 29 of the governor frame 24 longitudinally of the shaft 7. (See Fig. 1).

The governor weights W, adjustable as at w, are set normally to hold the arms 25ª and 25ᵇ in easy engagement with the faces of the ring 26 and plate 28. On increasing rotation of the shaft 7 the weights W are thrown outwardly and the arms 25ª and 25ᵇ bear with increasing force on the ring 26 and plate 28 against the action of the springs 27 and 30.

The face plate 28, as indicated in Fig. 1, is bushed as at 31. The bushing is upset at its ends as at 31ª and 31ᵇ to hold the spring 30 and plate 28 in an assembly. The flanged end 31ª is made part of a thrust bearing 32 between the spring 30 and the casing 11. The face plate 28 with its outer annular member 33 carries at its ends annular clutch plates 34 disposed to engage the clutch plates 35 on the shoulders 36 on the casing 11.

The spring 30 tends to hold the plate 28 tightly against the bushing end 31ᵇ. The initial force exerted by the governor on the plate 28 tends to slide the gear casing 11 on the shaft 3 until the clutch discs 22 and 23 are interengaged, whereupon the casing 11 is locked against further rotation with the drive shaft 3.

Any further increase in speed would force the plate 28 against the spring 30 tending to lock the clutch plates 35 on the plate 28 and clutch plates 36 on the gear casing 11, whereupon the casing 11 would be locked to and rotate with the connecting shaft 7, establishing a direct drive. At such a phase, the member 17 of the gear 15 may be running free relative to the gear casing 11 by reason of the accommodation of the clutch 19.

While in normal operation, the idler assembly of gear casing 11 and gear 10 would rotate at its established speed with regard to the drive shaft 3, there may be a tendency for it to run ahead of the drive shaft and to prevent this the over-running clutch 14 locks the casing 11 to the drive shaft 3.

The mechanism just suggested will automatically change the gear ratios between the drive and driven shaft to provide successively first, second, and third, or high speeds.

The head 5 of the driven shaft 6 is exteriorly threaded to receive a cap 37 between which and the hub 38 on the casing 1 is a thrust bearing indicated at 39. The head 5 is exteriorly threaded to receive the cap 40 between which and the casing 1 is located a thrust bearing 41. The spring 27 is anchored in the head 5 and in the slidable ring 26. The spring 27 is adapted to provide desired resistance to the governor to permit desired acceleration and normally offers a torsional resistance effective to prevent the shaft 7 from advancing in the head 5.

On an increase in torque, the torsional resistance of the spring 27 is affected, and the connecting shaft 7 will thread further into the head 5 moving the governor rearwardly and causing the spring 27 to bear with greater pressure on the ring 26 thereby opposing the action of the governor.

On a decrease in torque, the head 5 tends to expel the connecting shaft 7 and in this it is assisted by the spring 27 and should the driven shaft 6 tend to drive and further expel the connecting shaft 7, this action would be limited by the tightening of the spring 27 around the shaft 7. The torsional tension of the spring 27 thus tends to rotate the connecting shaft 7 and limits its movement. The lateral tension of the spring 27 acts upon the slidable ring 26 which bears against arms 25ª of the governor tending to oppose the action of the governor.

Such a device as I have indicated is well adapted to be rotatably supported in any suitable way by the vehicle as by the cross members 42 and 43 separated from the housing 1 or the shafts by suitable ball bearings indicated as at 44 and 45. The housing 1 is provided with any suitable brake. This I have shown for illustrative purposes as a brake band 46 having a suitable lining 47. The brake band 46 is formed with upturned ends 48 and 49. The end 48 is secured to a rod 50 carried by the frame of the car as by the support 51. The end 49 is slidable on the rod 50. Pivoted to the end of the rod 50 is a bell crank lever 52 having a portion 53 adapted to bear against the end 49 to tighten the brake band 46 around the housing 1 to prevent its rotation. The lever 52 may be actuated by the operator by any suitable connections (not shown).

The adjustment and strength of the spring 27 will depend on the desired basis of operation as a stronger spring must be used if it is desired to effect an engagement of the clutches 22 and 23 to lock the member 15 to the casing 1 when the driven shaft is not being rotated so that the initial gear ratio will be that of second or of first speed depending on the torque. That is, the spring 27 will urge the ring 26 against the arm 25ª of the governor and lock it against the central portion of the governor frame 24. The spring 27 will also, when adjusted to permit this operation, tend to expel the connecting shaft 7 resulting in an engagement of the clutches 22 and 23 by similar axial movement of the parts as has been described in connection with second speed.

It will be noted that during high speed the housing 1 plays no active part and for that reason the brake will not be subject to wear except during low and second speeds.

In accordance with my invention I am able to provide an automatic change speed device in which the gear ratio changes are made dependent on the speed and torque of the driven shaft.

What I therefore claim and desire to secure by Letters Patent is:

1. In a change speed device, a drive shaft, a driven shaft, an idler assembly connecting said shafts and rotatable independently thereof, means adapted to limit and prevent rotation of said assembly counter to that of said drive shaft, means to rotate said assembly with said driven shaft, a governor responsive to the speed of the driven shaft to actuate said means successively, a member adapted to oppose the action of said governor, and means to position said governor in desired relation to said member dependent on driven shaft torque.

2. In a change speed device, a driven shaft including a driving portion and a driven portion, and a connection between said portions permitting axial movement of said driving portion, said driving portion being mounted in said device for axial movement, a governor mounted on said driving portion, means adapted to oppose the action of said governor, said means comprising a member slidably secured to said driving portion, and a spring secured to said member and said driven portion, said spring being resistant to predetermined torque and being spirally disposed to prevent said portions from becoming unconnected.

3. In a change speed device, a driven shaft including a driving portion and a driven portion, and a connection between said portions permitting axial movement of said driving portion, said driving portion being mounted in said device for axial movement, a governor mounted on said driving portion, means adapted to oppose the action of said governor, said means comprising a member slidably secured to said driving portion, and a spring spirally disposed about said driving portion and secured to said member and said driven portion, said spring being resistant to predetermined torque and being adapted to be tightened about said driving portion when said driven portion tends to drive said driving portion whereby the axial movement of said driving member is limited.

4. In a change speed device, a drive shaft, a driven shaft, an idler assembly connecting said shafts, means independently slidable and rotatable adapted to prevent rotation of said assembly counter to that of said drive shaft, and slidable means adapted to rotate said assembly with said driven shaft, said means being adapted to become operative on sliding of said assembly in relation to said first named means and said second named means in relation to said assembly, means sensitive to the driven shaft torque, and a governor responsive to said means adapted to effect said sliding movements.

5. In a change speed device, a drive shaft, a driven shaft, an idler assembly connecting said shafts, means independently slidable and rotatable adapted to prevent rotation of said assembly counter to that of said drive shaft, and slidable means adapted to rotate said assembly with said driven shaft, said means being adapted to become operative on sliding of said assembly in relation to said first named means and said second named means in relation to said assembly, a slidable governor responsive to the speed of the driven shaft adapted to effect said sliding movements, and means sensitive to the torque adapted to slide said governor to permit gear ratio changes to be made subject to the speed and torque of said driven shaft.

6. In a change speed device, a drive shaft and a driven shaft, an independently rotatable housing overlying said shafts, means within said housing adapted to connect said shafts at different ratios, said means including members adapted to rotate said housing, operator controlled means for preventing the rotation of said housing to cause said driving means to rotate said driven shaft, and means within said housing for effecting gear ratio changes.

7. In a change speed device, a drive shaft and a driven shaft, an independently rotatable housing overlying said shafts, means within said housing adapted to connect said shafts at different ratios, said means including members adapted to rotate said housing, operator controlled means for preventing the rotation of said housing to cause said driving means to rotate said driven shaft, means within said housing for effecting gear ratio changes, and said means including members responsive to the speed and torque of the driven shaft.

8. In a change speed device, a drive shaft, a driven shaft, an idler assembly connecting said shafts and rotatable independently thereof, means adapted to limit and prevent rotation of said assembly counter to that of said drive shaft, a governor responsive to the speed of the driven shaft adapted to operate said means in succession, and torque controlled means including a resilient member adapted to permit said assembly to be held against rotation to that of said drive shaft on less than a predetermined driven shaft torque, whereby excessive driven shaft torque is effective to cause retarded rotation of said assembly counter to that of said drive shaft.

9. In a change speed device, a drive shaft, a driven shaft, an idler assembly connecting said shafts and rotatable independently thereof, means adapted to limit and prevent rotation of said assembly counter to that of said drive shaft, a governor responsive to the speed of the driven shaft adapted to operate said means in succession, and torque controlled means adapted to oppose the action of said governor, said torque controlled means including a resilient member adapted to permit said assembly to be held against rotation counter to that of said drive shaft on less than a predetermined driven shaft torque, whereby excessive driven shaft torque is effective to cause retarded rotation of said assembly counter to that of said drive shaft.

10. In a change speed device, a drive shaft, a driven shaft, an idler assembly connecting said shafts and rotatable independently thereof, means adapted to limit and prevent rotation of said assembly counter to that of said drive shaft, means adapted to rotate said assembly with said drive shaft, a governor responsive to the speed of the driven shaft adapted to operate said means in succession, and torque controlled means adapted to oppose the action of said governor, said torque controlled means including a resilient member adapted to permit said assembly to be held against rotation counter to that of said drive shaft on less than a predetermined driven shaft torque, whereby excessive driven shaft torque is effective to cause retarded rotation of said assembly counter to that of said drive shaft.

11. In a change speed device, a drive shaft, a driven shaft including driving and driven portions having a threaded interconnection effective to permit limited axial movement of said driving portion, means adapted to connect said shafts at different ratios, said means including axially slidable members, a governor responsive to the speed of said driven shaft to position said slidable members, and a compressible member separating said slidable members to cause ratio changes to be effected in predetermined order, and torque controlled means adapted to influence the operation of said governor, said torque controlled means comprising a member slidably carried by said driving portion of said driven shaft, a spring connecting said last named member and said driven shaft, whereby on increase in torque, said governor is carried axially and subjected to increased opposition to retard its normal action.

12. In a change speed device, a drive shaft, a driven shaft, means adapted to connect said shafts at different ratios, said means including slidable members, said driven shaft including a driven portion and a driving portion threaded therein, a governor mounted on said driving portion, said governor being adapted to position said slidable members to effect different ratios between said governor and said driven portion and compressible means mounted in opposition to the action of said governor and anchored in said driven shaft whereby variations in torque vary the resistance of said compressible member to governor action.

13. In a change speed device, a driven shaft including a driving and a driven portion having a threaded connection effective to permit limited axial movement of said driving portion, a governor carried by said driving portion, and torque controlled means connecting said portions and said torque controlled means including a member slidably splined to said driving portion in governor dominating position and a compressible member anchored in said driven portion and connected to said splined member and being disposed to offer torsional resistance to axial movements of said driving portions.

14. In a change speed device, a driven shaft including a driving and a driven portion having a threaded connection effective to permit limited axial movement of said driving portion, a governor carried by said driving portion, and torque controlled means connecting said portions and said torque controlled means including a compressible member anchored in said driven portion and a member slidably splined to said driving portion in governor dominating position and said compressible member being disposed to offer torsional resistance to axial movements of said driving portions, and to offer a resistance to said governor commensurate to the torque increase.

15. In a change speed device, a driven shaft including a driving and a driven portion having a threaded connection effective to permit limited axial movement of said driving portion, a member slidably mounted on said driving portion, a governor mounted on said driving portion to actuate said slidable member, and compressible means connecting said driven shaft portions and to oppose the action of said governor and axial movements of said driving portion.

16. In a change speed device, a driven shaft including a driving and a driven portion having a threaded connection effective to permit limited axial movement of said driving portion, a member slidably mounted on said driving portion, a governor mounted on said driving portion to actuate said slidable member, compressible means connecting said driven shaft portions and to oppose the action of said governor and axial movements of said driving portion, said compressible means comprising a member slidably splined to said driving portion, and a spring spirally disposed about said driving portion and anchored in said driven portion.

JESSE W. HALE.